Patented July 20, 1948

2,445,567

UNITED STATES PATENT OFFICE 2,445,567

STABILIZING ORGANO-SUBSTITUTED POLYSILOXANES

John R. Elliott, Schenectady, N. Y., assignor to General Electric Company, a corporation of New York No Drawing. Application August 27, 1946, Serial No. 693,376

17 Claims. (Cl. 260—448.2)

1

The present invention relates to the stabilization of organo-substituted polysiloxanes against gelation. More particularly, the invention is concerned with a method of stabilizing a liquid organo-substituted polysiloxane, e. g., a liquid, non-resinous, hydrocarbon-substituted polysiloxane containing from about 1.9 to 2.5 hydrocarbon groups per silicon atom, which method comprises incorporating in the said liquid polysiloxane stabilizing amounts of a metal salt of an organic acid, the metal cation of the said salt being selected from the class consisting of iron, cobalt, nickel, and copper.

Liquid organo-substituted polysiloxanes are compositions comprising essentially silicon atoms connected to one another by oxygen atoms as illustrated by the following structure called a siloxane structure —Si—O—Si— wherein a preponderant number of the valences of the silicon atoms are satisfied by the substitution thereon of organic radicals. These compositions of matter may be prepared, for example, by the hydrolysis of hydrolyzable organo-substituted silanes, e. g., dihydrocarbon-substituted dihalogenosilanes, for instance dimethyl dichlorosilane, followed by complete or partial condensation of the hydrolysis product. They may also be prepared by hydrolyzing mixtures of hydrolyzable di-organo-substituted silanes among themselves or with hydrolyzable silanes containing, for example, three organic radicals substituted on the silicon atom, for instance, trimethyl chlorosilane. More specific directions for the hydrolysis of hydrolyzable organo-substituted silanes to form liquid organo-substituted polysiloxanes may be found e. g., in Patnode applications, Serial Nos. 463,813, now abandoned, 463,814, and 463,815, said applications filed October 29, 1942, and in Wilcock application Serial No. 656,162, filed March 21, 1946, the foregoing applications being assigned to the same assignee as the present invention.

2

By the term "hydrolyzable organo-substituted silanes" is intended to mean derivatives of SiH$_4$ which contain hydrolyzable groups or radicals, e. g. halogens, amino groups, alkoxy, aryloxy, and acyloxy radicals, etc., in addition to the organic groups substituted directly on the silicon atom that are joined to the silicon through carbon-silicon linkages. Examples of such organic radicals are aliphatic radicals, including alkyl radicals, e. g., methyl, ethyl, propyl, butyl, etc.; alicyclic radicals, e. g., cyclopentyl, cyclohexyl, etc.; aryl radicals, e. g., phenyl, diphenyl, anthracyl, naphthyl, etc.; aralkyl radicals, e. g., benzyl, phenylethyl, etc.; alkaryl, e. g., tolyl, xylyl, etc.; alkenyl radicals, etc., as well as hydrolyzable silanes containing two different organic radicals, e. g., methyl and phenyl radicals, etc., attached to the silicon atom. If desired, the above-mentioned radicals may also contain substituents substituted thereon for instance, halogens.

Hydrolysis of the above silanes or mixtures of the silanes results in the formation of silanols, i. e., organo-substituted silanes containing hydroxy groups substituted directly on the silicon, which hydroxy groups almost immediately condense intermolecularly (intercondense) splitting out water to give the siloxane linkages mentioned previously. Such intercondensations are accelerated by acidic materials, e. g., sulfuric acid, hydrochloric acid, ferric chloride, etc., as well as by basic materials, e. g., sodium hydroxide, ammonium hydroxide, etc. As a result of the hydrolysis and condensation, organopolysiloxanes may be produced which are partially or completely condensed and which may have on the average up to as high as three organic radicals substituted per silicon atom. The liquid organopolysiloxanes i. e., liquid organo-substituted polysiloxanes, prepared in this manner consist essentially of silicon atoms joined together by oxygen atoms through silicon-oxygen linkages and organic radicals attached to silicon through carbon-silicon linkages, the remaining valances, if any, of the silicon atoms being satisfied by hydroxyl radicals and/or by residual unhydrolyzed radicals such as the hydrolyzable radicals listed previously.

The viscosity of the liquid organopolysiloxanes obtained in the above fashion may vary, for instance, depending, e. g., upon the starting materials, hydrolysis medium, temperature, etc. These materials have good resistance to the effect of heat for great lengths of time at temperatures of the order of 100° to 150° C. At these temperatures they resist decomposition much better for longer periods of operation than other organic non-silicon-containing liquid materials, as, for example, mineral oils, organic esters, vegetable oils, etc. However, at higher temperatures above 150° C., e. g. at 175° to 225° C. or higher, even the liquid organopolysiloxanes undergo a change in properties when exposed to the combined effect of these elevated temperatures and air for extended periods of time. For instance, when liquid organopolysiloxanes, e. g., a liquid methyl polysiloxane containing a preponderant number of silicon atoms having substituted thereon two methyl groups and often referred to as a "liquid methyl silicone" (see the aforementioned Patnode applications for a more complete dscription of these materials), are heated at elevated temperatures (about 175° to 225° C.) for extended periods of time in the presence of air, there is usually obtained an increase in the viscosity of the liquid, often followed by gelation of the liquid material. In cases where such liquids are employed e. g., as lubricating or dielectric media, for hydraulic purposes or in diffusion pumps for the production of high vacua, such a change in properties is highly undesirable, especially in view of the fact that operating temperatures of oils may accidentally rise to these higher limits.

I have now found that this undesirable increase in viscosity and subsequent gelation at these elevated temperatures may be substantially retarded by incorporating in the liquid organopolysiloxane a stabilizer therefor comprising a metal salt of an organic acid, the metal cation of the said salt being selected from the class consisting of iron, cobalt, nickel, and copper. The amount of stabilizer required to exert a stabilizing effect is very small. Thus, by weight, I may employ from about 0.007 to about 4 or 5 per cent stabilizer based on the weight of the liquid organopolysiloxane. Preferably I employ from about 0.05 to 1 per cent stabilizer. Amounts substantially in excess of 2 or 3 per cent offer no particular advantage and may actually not be as good as amounts within the lower ranges. The stabilized liquid organopolysiloxanes obtained by the practice of my invention exhibit good resistance to change in viscosity and, in addition, the time before gelation of the liquid organopolysiloxanes at elevated temperatures may occur is greatly delayed.

Among the stabilizers which may be employed in the practice of my invention are, for example, the iron salts of organic acids (aliphatic and aromatic acids) for example, the iron salts of the saturated aliphatic fatty acids, e. g., iron acetate, iron propionate, iron butyrate, iron isobutyrate, iron n-hexanoate (hexoate), iron 2-ethyl hexanoate, etc., especially the iron salts of the branched chain saturated aliphatic fatty acids containing from about 4 to 14 carbon atoms which salts are more soluble in the liquid organopolysiloxanes than the straight chain derivatives; iron salts of the aromatic acids, e. g., iron benzoate, iron naphthalate, iron naphthanoate, iron toluate, etc.; iron salts of the acyclic acids, e. g., iron cyclohexanoate, (iron cyclohexyl carboxylate) etc.; iron salts of saturated and unsaturated, aliphatic and aromatic polycarboxylic acids, e. g., iron oxalate, iron succinate, iron adipate, iron maleate, iron phthalate, etc.; iron rosinate, etc.; iron salts of organic crude acids, which salts are often employed as driers for paints, e. g., iron "Nuodex" which comprises mainly iron naphthenate, iron rosinate (known in the trade as "Uversol iron") which comprises mainly iron abietate, etc. It will, of course, be understood that the corresponding cobalt or nickel or copper salts of the aforementioned organic acids, as illustrated by the iron salts listed above, are also embraced within the scope of my claimed invention.

In order that those skilled in the art may better understand how the present invention may be practiced, the following examples are given by way of illustration and not by way of limitation. All parts and percents are by weight.

EXAMPLE 1

A liquid dimethyl polysiloxane i. e., a liquid methyl polysiloxane containing a preponderant number of silicon atoms having substituted thereon two methyl groups and (often referred to as a "liquid methyl silicone") having a methyl to silicon ratio slightly above 2, was prepared by hydrolyzing in an excess of water a mixture comprising approximately 85.6 mol per cent dimethyl dichlorosilane, 4.5 mol per cent methyl trichlorosilane, and 9.9 mol per cent trimethyl chlorosilane. The oily layer was removed, and shaken with concentrated sulfuric acid for 24 hours. The mixture was thereafter diluted with water and the oily layer (liquid dimethyl polysiloxane) was separated from the aqueous layer and dried.

The liquid dimethyl polysiloxane prepared above was stabilized with varying amounts of iron octanate prepared by effecting reaction between ferric chloride and sodium 2-ethyl hexoate in some of the liquid dimethyl silicone oil. This solution containing the iron 2-ethyl hexoate (iron octanate) was added in varying amounts to portions of the dimethyl silicone oil to give the desired amount of stabilizer in the oil. The stabilized oil was heated in a 300° C. oven until gelling of the oil occurred.

Table 1

| Parts Oil | Weight Per Cent Iron Octanate | Hours in the 300° C. Oven | |
|---|---|---|---|
| | | As a Fluid | Gelled |
| 100 | 0 | 1.0 | 1.7 |
| 100 | 0.0077 | 2.4 | 3.5 |
| 100 | 0.0770 | 24.0 | 27.0 |
| 100 | 0.10 | 54.0 | 68.0 |
| 100 | 0.26 | 359.0 | 380.0 |
| 100 | 0.77 | 105.0 | 120.0 |

This example illustrates that even at 300° C. a liquid organopolysiloxane may be stabilized to remain fluid for a comparatively long period of time whereas the unstabilized oil gels within less than 2 hours at this temperature.

EXAMPLE 2

In this example different stabilizers were added to the liquid dimethyl polysiloxane prepared in Example 1. The stabilized oils were heated in a 200° C. oven to determine the length of time required before gelation of the oil occurred.

| Parts Oil | Stabilizer | Weight Per Cent Stabilizer | Days in 200° C. Oven Before Occurrence of Gelation |
|---|---|---|---|
| 100 | None | 0 | Gelled in 10 days. |
| 100 | Cobalt 2-ethyl hexoate [1] | 1 | Still fluid after 100 days. |
| 100 | ----do---- | 0.5 | Do. |
| 100 | ----do---- | 0.25 | Do. |
| 100 | ----do---- | 0.10 | Do. |
| 100 | Nickel 2-ethyl hexoate [2] | 1 | Do. |
| 100 | ----do---- | 0.5 | Do. |
| 100 | ----do---- | 0.25 | Do. |
| 100 | ----do---- | 0.10 | Do. |
| 100 | Copper naphthenate | 1.0 | Do. |
| 100 | Iron naphthenate | 1.0 | Do. |
| 100 | Iron rosinate [3] | 1.0 | Do. |

[1] The cobalt 2-ethyl hexoate was prepared by effecting reaction between cobalt sulfate and sodium 2-ethyl hexoate in a portion of the dimethyl silicone oil and small amounts of this mixture were added to the unstabilized oil to give the desired amount of stabilizer.

[2] The nickel 2-ethyl hexoate was prepared by effecting reaction between nickel sulfate and sodium 2-ethyl hexoate in the same manner as was employed in the preparation of cobalt 2-ethyl hexoate.

[3] The iron rosinate may be prepared by effecting reaction between ferric chloride and sodium rosinate. (Rosin is comprised chiefly of abietic acid.)

From the foregoing examples, it will be apparent that liquid organopolysiloxanes of the type employed in the practice of my invention can be stabilized to remain fluid for extended periods of time at elevated temperatures e. g., about 100° C. of operation. By means of my invention, I am also able to maintain a relatively constant or only a very gradually increasing viscosity of these liquid organopolysiloxanes at these elevated temperatures for extended periods of time. Liquid organopolysiloxanes of the type employed in the foregoing examples are quite stable at temperatures of about 100° to 150° C. where other organic lubricating oils are not capable of being used. However, at temperatures above 150° or 160° C., e. g., 175° to 225° C., unless they are suitably stabilized, the liquid organopolysiloxanes increase in viscosity and tend to gel.

It will, of course, be understood by those skilled in the art that stabilizers other than those employed in the above illustrations of the practice of my invention may also be used, many examples of which have been given previously with regard to the iron salts. These include, in addition to the iron salts, e. g., the nickel, cobalt, and copper salts of the fatty acids, especially those salts of the branched chain saturated fatty acids containing from about 4 to 14 carbon atoms, etc.; the nickel, cobalt, and copper salts of the aromatic acids; the nickel, cobalt, and copper salts of the acyclic acids; the nickel, cobalt, and copper salts of saturated and unsaturated aliphatic and aromatic polycarboxylic acids; the nickel, cobalt and copper salts of crude acids, which salts are usually employed as driers for paints, etc.

The use of the stabilizers in accordance with my invention is especially adaptable for liquid organopolysiloxanes, for instance, the liquid alkyl-substituted polysiloxanes, e. g., liquid methyl-, ethyl-, propyl-, butyl-, isopropyl-substituted polysiloxanes, etc.; the liquid aryl-substituted polysiloxanes, e. g., the liquid phenyl-substituted polysiloxanes, etc.; the liquid organopolysiloxanes containing different hydrocarbons substituted on the silicon atom or atoms, e. g., liquid-methyl- and phenyl-substituted polysiloxanes, etc., as well as liquid organopolysiloxanes containing both alkyl and aryl hydrocarbons substituted on different silicon atoms, e. g., liquid organopolysiloxanes obtained by hydrolyzing a mixture comprised substantially of dimethyl-dichlorosilane and diphenyl dichlorosilane. These stabilizers are especially useful in stabilizing liquid organopolysiloxanes containing an average, of from about 1.9 to 2.5 hydrocarbon groups, especially 2.0 to 2.2 hydrocarbon groups per silicon atom.

What I claim as new and desire to secure by Letters Patent of the United States is:

1. The method of stabilizing a liquid organopolysiloxane which comprises incorporating therein stabilizing amounts of a metal salt of an organic carboxylic acid, the metal cation of the said salt being selected from the class consisting of iron, cobalt, nickel, and copper.

2. The method of stabilizing a liquid hydrocarbon-substituted polysiloxane which comprises incorporating therein stabilizing amounts of an iron salt of an organic carboxylic acid.

3. The method of stabilizing a liquid hydrocarbon-substituted polysiloxane which comprises incorporating therein stabilizing amounts of a cobalt salt of an organic carboxylic acid.

4. The method of stabilizing a liquid hydrocarbon-substituted polysiloxane which comprises incorporating therein stabilizing amounts of a nickel salt of an organic carboxylic acid.

5. The method of stabilizing a liquid dimethyl polysiloxane which comprises incorporating therein stabilizing amounts of iron 2-ethyl hexanoate.

6. The method of stabilizing a liquid dimethyl polysiloxane which comprises incorporating therein stabilizing amounts of cobalt 2-ethyl hexanoate.

7. The method of stabilizing a liquid dimethyl polysiloxane which comprises incorporating therein stabilizing amounts of nickel 2-ethyl hexanoate.

8. A composition of matter comprising (1) a liquid organo-substituted polysiloxane and (2) a minor proportion of a stabilizer therefor comprising a metal salt of an organic carboxylic acid, the metal cation of the said salt being selected from the class consisting of iron, cobalt, nickel, and copper.

9. A composition of matter comprising (1) a liquid hydrocarbon-substituted polysiloxane and (2) a minor proportion of a stabilizer therefor comprising an iron salt of an organic carboxylic acid.

10. A composition of matter comprising (1) a liquid hydrocarbon-substituted polysiloxane and (2) a minor proportion of a stabilizer therefor comprising a cobalt salt of an organic carboxylic acid.

11. A composition of matter comprising (1) a liquid hydrocarbon-substituted polysiloxane and (2) a minor proportion of a stabilizer therefor comprising a nickel salt of an organic carboxylic acid.

12. A composition of matter comprising (1) a liquid hydrocarbon-substituted polysiloxane containing an average of from approximately 1.9 to 2.5 hydrocarbon radicals per silicon atom, said hydrocarbon radicals being attached to the silicon atoms through carbon-silicon linkages, at least some of said hydrocarbon radicals being alkyl radicals, and (2) a minor proportion of an iron salt of a branched chain aliphatic carboxylic acid containing from 4 to 14 carbon atoms.

13. A composition of matter comprising (1) a liquid hydrocarbon-substituted polysiloxane containing an average of from approximately 1.9 to 2.5 hydrocarbon radicals per silicon atom, said hydrocarbon radicals being attached to the silicon atoms through carbon-silicon linkages, at least some of said hydrocarbon radicals being alkyl radicals, and (2) a minor proportion of a cobalt salt of a branched chain aliphatic carboxylic acid containing from 4 to 14 carbon atoms.

14. A composition of matter comprising (1) a liquid hydrocarbon-substituted polysiloxane containing an average of from approximately 1.9 to 2.5 hydrocarbon radicals per silicon atom, said hydrocarbon radicals being attached to the silicon atoms through carbon-silicon linkages, at least some of said hydrocarbon radicals being alkyl radicals, and (2) a minor proportion of a nickel salt of an organic branched chain aliphatic carboxylic acid containing from 4 to 14 carbon atoms.

15. A heat-stabilized composition of matter comprising (1) a liquid dimethyl polysiloxane and (2) a minor proportion of iron 2-ethyl hexanoate.

16. A heat-stabilized composition of matter comprising (1) a liquid dimethyl polysiloxane and (2) a minor proportion of cobalt 2-ethyl hexanoate.

17. A heat-stabilized composition of matter comprising (1) a liquid dimethyl polysiloxane and (2) a minor proportion of nickel 2-ethyl hexanoate.

JOHN R. ELLIOTT.

REFERENCES CITED

The following references are of record in the file of this patent:

UNITED STATES PATENTS

| Number | Name | Date |
| --- | --- | --- |
| 2,389,804 | McGregor | Nov. 27, 1945 |
| 2,389,805 | McGregor | Nov. 27, 1945 |
| 2,389,807 | McGregor | Nov. 27, 1945 |